(12) United States Patent
Parikka et al.

(10) Patent No.: US 11,327,356 B2
(45) Date of Patent: May 10, 2022

(54) LIGHT GUIDE FOR SEGMENTED ILLUMINATION

(71) Applicant: Nanocomp Oy Ltd, Finland (FI)

(72) Inventors: Marko Parikka, Joensuu (FI); Marko Honkanen, Hammaslahti (FI); Joni Orava, Joensuu (FI)

(73) Assignee: NANOCOMP OY LTD, Lehmo (FI)

( * ) Notice: Subject to any disclaimer, the term of this patent is extended or adjusted under 35 U.S.C. 154(b) by 0 days.

(21) Appl. No.: 16/969,399

(22) PCT Filed: Feb. 2, 2018

(86) PCT No.: PCT/FI2018/050094
§ 371 (c)(1),
(2) Date: Aug. 12, 2020

(87) PCT Pub. No.: WO2019/155112
PCT Pub. Date: Aug. 15, 2019

(65) Prior Publication Data
US 2021/0048707 A1 Feb. 18, 2021

(51) Int. Cl.
G02F 1/1335 (2006.01)
F21V 8/00 (2006.01)
G02F 1/13357 (2006.01)

(52) U.S. Cl.
CPC ..... *G02F 1/133524* (2013.01); *G02B 6/0038* (2013.01); *G02B 6/0055* (2013.01); *G02B 6/0073* (2013.01); *G02F 1/133603* (2013.01)

(58) Field of Classification Search
CPC ................................................ G02F 1/133524
See application file for complete search history.

(56) References Cited

U.S. PATENT DOCUMENTS

2003/0235047 A1 12/2003 Choi et al.
2004/0130884 A1 7/2004 Yoo et al.
(Continued)

FOREIGN PATENT DOCUMENTS

WO 20160182549 A1 11/2016
WO 2017137653 8/2017

OTHER PUBLICATIONS

Application No. PCT/FI2018/050094, International Search Report and Written Opinion, dated Nov. 1, 2018, 15 pages.
(Continued)

*Primary Examiner* — Edmond C Lau
(74) *Attorney, Agent, or Firm* — Kilpatrick Townsend & Stockton LLP

(57) ABSTRACT

A light guide (100) comprises a light guide plate (110) with an illumination region (111). The light guide plate has a first main surface (112) and a second main surface (113) opposite to the first main surface, and comprises an out-coupling arrangement (120) for coupling light (150) propagating in the light guide plate out of the light guide plate through the first and/or the second main surface in the illumination region. The out-coupling arrangement comprises first out-coupling stripes (121) extending over the illumination region, each first out-coupling stripe defining a horizontal extension of a first light channel (141) in the light guide plate and being configured to couple light propagating substantially in a first direction along the first light channel, out of the light guide plate. Adjacent first out-coupling stripes are separated by an intermediate region (124) with light coupling properties substantially different from those of the first out-coupling stripes.

13 Claims, 5 Drawing Sheets

(56) References Cited

U.S. PATENT DOCUMENTS

| | | |
|---|---|---|
| 2004/0207775 A1 | 10/2004 | Min et al. |
| 2009/0122227 A1 | 5/2009 | Hong et al. |
| 2010/0253881 A1 | 10/2010 | Jaejung et al. |
| 2011/0109533 A1 | 5/2011 | Suzuki |
| 2011/0299298 A1 | 12/2011 | Liang |
| 2012/0032997 A1* | 2/2012 | Cha .................. G02B 6/0076 345/690 |
| 2016/0150221 A1* | 5/2016 | Lee .................. H04N 13/307 348/59 |

OTHER PUBLICATIONS

Application No. EP 18904772.3, Extended European Search Report, dated Jul. 27, 2021, 7 pages.

\* cited by examiner

LIGHT GUIDE FOR SEGMENTED ILLUMINATION

CROSS-REFERENCE TO RELATED APPLICATIONS

The present application is a U.S. national phase application under 35 U.S.C. § 371 of PCT/FI2018/050094, filed on Feb. 2, 2018, the entire contents of which are incorporated by reference herein for all purposes.

BACKGROUND

Light guide films and plates are used in various applications, such as in back light and front light arrangements for displays, to guide and re-distribute light.

In various types of displays such as Liquid Crystal Displays (LCD), the contrast performance of the display is one of the key features affecting the user experience of the display. Primarily, contrast refers to the emitted intensity difference between bright and dark pixels or regions of the display.

Optimizing the contrast performance may require segmented illumination with different regions of the display being illuminated with different intensities.

In edge-lit configurations, segmented illumination may be achieved by using a segmented light guide plate structure with the light guide plate being divided into a plurality of segments or light channels. Adjacent segments or light channels may be separated by confining stripes with a refractive index differing from that of the light channel, allowing the light received into a light channel to propagate therein via total internal reflections at the interfaces between the light channel and the confining stripes. An example of a light guide with plurality of light channels is disclosed in WO 2017/137653 A1.

The performance of a segmented light guide may require high design and/or manufacturing accuracy in order to avoid dark or bright illumination lines appearing between adjacent segments or light channels.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In a first aspect, a light guide for segmented illumination may be implemented which is characterized by what is specified in claim 1. The light guide comprises a light guide plate with an illumination region. The light guide plate has a first main surface and a substantially parallel second main surface opposite to the first main surface and separated therefrom by a thickness of the light guide plate.

The light guide plate comprises an out-coupling arrangement for coupling light propagating in the light guide plate and interacting with the out-coupling arrangement out of the light guide plate through the first and/or the second main surface in the illumination region.

The out-coupling arrangement comprises a plurality of first out-coupling stripes extending over the illumination region, each first out-coupling stripe defining a horizontal extension of a first light channel in the light guide plate and being configured to couple light propagating, with the light guide in use, substantially in a first direction along the first light channel, out of the light guide plate. Adjacent first out-coupling stripes are separated by an intermediate region with light coupling properties substantially different from those of the first out-coupling stripes.

An illumination module may be implemented comprising a light guide of the first aspect, and a plurality of light-emitting elements such as LEDs arranged for emitting light to the light channels.

A display assembly such as a liquid crystal assembly may be implemented comprising a display element such as a liquid crystal layer and a light guide of the first aspect arranged for illuminating the display element.

DESCRIPTION OF THE DRAWINGS

The present description will be better understood from the following detailed description read in light of the accompanying drawings, wherein.

The drawings of the FIGS. are schematic and not to scale.

DETAILED DESCRIPTION

The detailed description provided below in connection with the appended drawings is intended as a description of a number of embodiments, but it is not intended to represent the only ways in which the embodiments may be constructed, implemented, or utilized.

At least some of the embodiments and examples discussed below may allow, for example, implementing a light guide, an illumination module, or a display assembly with accurately segmented illumination capability with substantially no or only weak dark or bright lines between the illumination segments.

Figure 1:
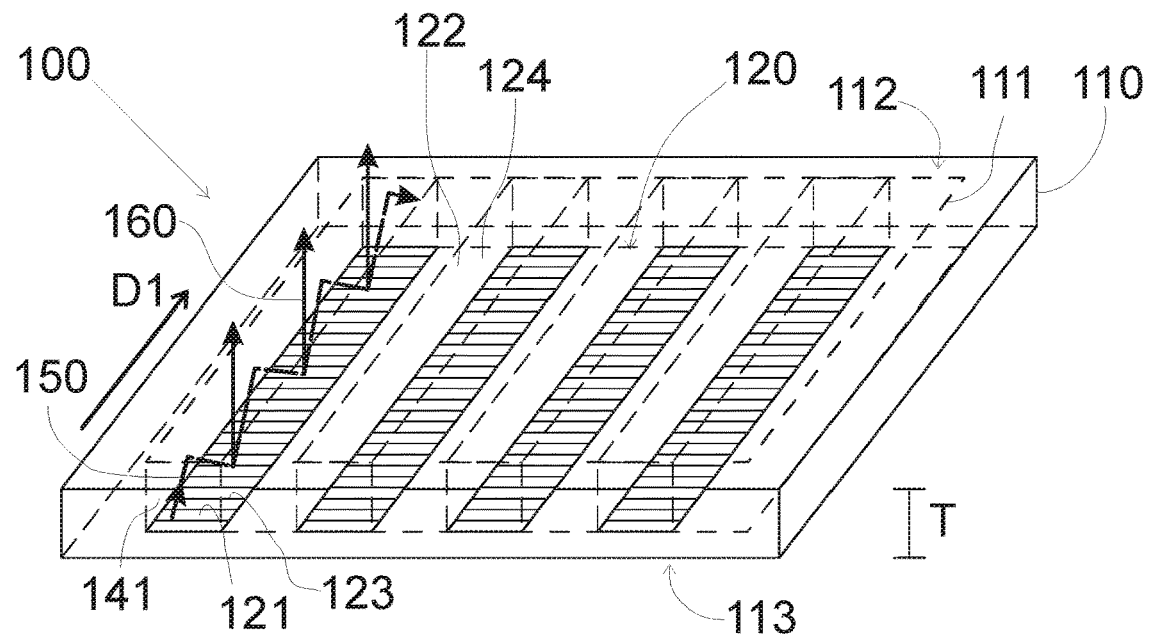
FIG. 1 illustrates a light guide plate of a light guide as a partially transparent perspective view.

The light guide 100 illustrated partially in FIG. 1 comprises a light guide plate 110 which has an illumination region 111.

A "light guide" refers to an optical element suitable and designed for guiding light therein, i.e. within the light guide. A light guide may comprise one or more light guide plates. Further, a light guide may comprise any other appropriate layers, elements, or structures, for example, for protective purposes or for enhancing the overall optical performance of the light guide.

A "plate" refers to a generally plate-like structure of the light guide plate, i.e. a structure extending two-dimensionally in horizontal or width directions, and having a thickness in the vertical or thickness direction, which thickness is substantially lower than the horizontal dimensions of the plate. A light guide "plate" may also be considered as light guide "sheet" or a light guide "film". A light guide plate may have any appropriate dimensions, depending on the application at issue. For example, it may have a width and/or a length in the range of 10 to 1000 mm and a thickness in the range of 0.1 to 3 mm.

The light guide plate has a first main surface 112 and a second main surface 113, which main surfaces lie opposite to each other. They are separated, in the "vertical" or thickness direction by a thickness T of the light guide plate.

The light guide plate may be configured to receive light which may then propagate within the light guide plate via total internal reflections at the first and the second main surfaces 112, 113 thereof, as illustrated by an arrow indicating a light beam 150.

The first and the second main surfaces of the light guide plate, lying opposite to each other and defining the thickness of the light guide plate, could be regarded as, for example, a lower/bottom and an upper/top surface of the light guide plate. However, it is to be noted that such references to upwards and downwards directions or upper or lower positions, as well as to "horizontal" and "vertical", shall be understood as defined relative to coordinates fixed to the light guide plate itself so that the first main surface is the "upper" main surface, and the second main surface is the "lower" main surface. In coordinates fixed to the direction of the gravity of Earth, for example, those surfaces may naturally lie in any direction, depending on the position of the light guide plate.

Thus, as long as the terms "vertical" and "horizontal" are used hereinafter in this specification, they shall be understood as auxiliary definitions not fixed relative to horizontal and vertical directions in the coordinates fixed relative to the gravity of Earth, or any other external coordinates.

In the example of FIG. 1, the first and the second main surfaces 112, 113 of the light guide plate 110 are planar and lie substantially parallel. So, they may be considered extending "horizontally". In other embodiments, first and second main surfaces of a light guide plate may be directed slightly differently. For example, a light guide plate may be wedge-shaped with one or both of the main surfaces thereof deviating from the horizontal or width direction.

The light guide plate 110 of FIG. 1 comprises an out-coupling arrangement 120 which is configured to couple light which propagates in the light guide plate out of it in the illumination region 111. The illumination region of the light guide plate refers to the region from which the light guide plate is intended to distribute the illumination out of it.

The out-coupling arrangement 120 comprises elongated first out-coupling stripes 121 extending over the illuminating region. In the example of FIG. 1, all first out-coupling stripes extend over the entire illumination region, i.e. their length covers the entire width of the illumination region 111. In some other embodiments, it may be possible that at least some of the first out-coupling stripes of an out-coupling arrangement extend over a part of the illumination region width only.

As forming part of the out-coupling arrangement, the first out-coupling stripes are configured to effect the out-coupling function for light interacting with the out-coupling arrangement in the area of the first out-coupling stripes, i.e. interacting with the first out-coupling stripes. The first out-coupling stripes 121 are thus configured to carry out the out-coupling function by coupling light, interacting with them, out of the light guide plate. Then, only such light may be coupled out of the light guide plate by a first out-coupling stripe which propagates in the light guide plate in the area of that first out-coupling stripe. Thereby, each first out-coupling stripe defines the horizontal extension of a first light channel 141 in the light guide plate.

The out-coupling performance of the first out-coupling stripes is configured so as to be directionally selective in that at a given location of the first out-coupling stripe, the out-coupling is efficient for light propagating along the first light channels substantially in one of its longitudinal directions only. Such direction, a "first direction", is marked by an arrow D1 in the drawing of FIG. 1. The directionally selective out-coupling performance means that the first out-coupling stripes do not substantially couple out light which propagates in the first light channels in the opposite second direction. At a given location of the coupling stripe, the substantially lower local coupling efficiency for such opposite direction may be, for example, less than or equal to 20% of the local out-coupling efficiency at that location for the first direction. In some embodiments, the local out-coupling efficiency to the second direction may be substantially zero at one or more locations.

"Local out-coupling efficiency" thus refers to the out-coupling efficiency at a given location of an out-coupling arrangement or an out-coupling stripe.

Figure 9:
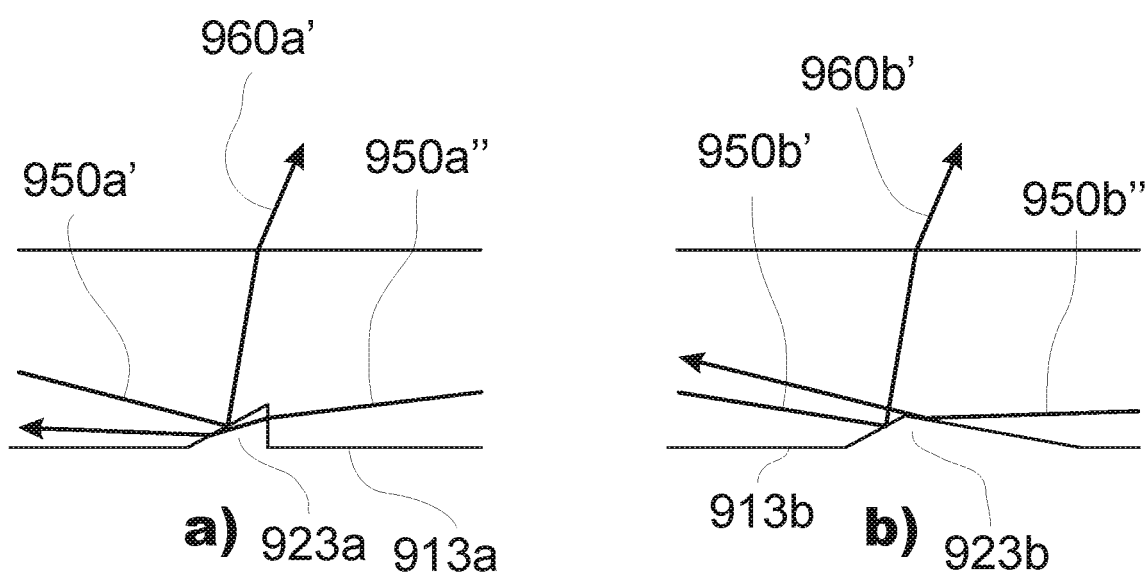
FIG. 9 illustrates side sectional views of details and operation of light guide plates.

The directionally selective local out-coupling efficiency of an out-coupling stripe may be achieved by means of any appropriate arrangements and/or structures. For example, in the case of diffractively operating coupling stripe, various types of diffractive micro features, such as binary or multilevel gratings, may be used. In the case of coupling stripes based on refractive or reflective operation, various types of asymmetric refractive or reflective micro structures may be arranged on or within the light guide plate. Some examples are illustrated in FIG. 9.

Other embodiments may be possible without such directional selectivity of the local out-coupling efficiencies.

A "light channel" thus refers to a volume in the light guide plate, the horizontal extension of which light channel is defined by an out-coupling stripe. In the vertical direction, a light channel may cover substantially the entire thickness of the light guide plate between the first and the second main surfaces thereof. Said out-coupling stripe is configured to couple light, propagating in the light channel at issue in an appropriate direction and interacting with the out-coupling stripe, out of the light guide plate.

Coupling light out of the light guide plate refers to coupling at least part of the light interacting with the out-coupling arrangement or an out-coupling stripe thereof out of the light guide plate. Then, the light flux (the light energy per time) propagating in the light guide plate may decrease step-wise at each interaction with the out-coupling arrangement. This is illustrated in FIG. 1 by that the out-coupling arrangement 120 is configured to couple a portion of the light 150 incident on it out of the light guide, into out-coupled light 160, whereas the rest of the light flux may be reflected by total internal reflection back to the light guide. Thereby, at each interaction with the out-coupling arrangement 120, part of the light 150 is coupled out of the light guide plate 110, into out-coupled light 160.

The local out-coupling efficiency may be uniform throughout the length of the first out-coupling stripes so that the out-coupled portion of the incident light energy is constant. Alternatively, the local out-coupling efficiency may vary, i.e. be different at different locations or regions of the light guide. For example, in the case of receiving light into the light guide through an edge surface thereof, the local out-coupling efficiency, i.e. the out-coupling efficiency at a given location, may be lower close to the edge and increase as the distance from the edge increases. Thereby, uniformity of the out-coupled light intensity may be improved.

Although the light 150 propagating in the light guide is illustrated in FIG. 1 as one single ray, it is to be understood that this is for illustrative purposes only. The lines and arrays indicate merely the propagation path of the light. Thus, the illustration of dividing the light flux or the light energy at each interaction with the out-coupling arrangement does not mean that the out-coupling arrangement would actually necessarily effect such division, although that may be the case especially with diffractive out-coupling arrangements. In the case of refractive or reflective out-coupling arrangements, instead, the illustration shall be understood as indicating that only part of the light flux actually interacts with the functional parts of the out-coupling arrangement, whereas the rest experiences just a total internal reflection at the light guide plate main surface.

An out-coupling arrangement and the out-coupling stripes thereof may basically comprise any appropriate means or structures enabling said function of coupling light which interacts with the out-coupling arrangement out of the light guide plate. In the example of FIG. 1, the out-coupling arrangement comprises optical micro features in the form of lines 123 which are oriented substantially perpendicular to the longitudinal direction of the first out-coupling stripes 121.

In other embodiments, other types of coupling arrangements, possibly comprising optical micro features, may be utilized. Instead of lines, such micro features may comprise, any appropriate types of dots, lines, grooves, ridges, or other types of structural micro features. Such structural micro features may comprise, for example, structures or patterns with two different height levels, i.e. binary structures. Alternatively, the optical micro features may have multi-level height variations with a plurality of discrete height levels, or they may have continuously or gradually varying height levels.

In yet other embodiments, instead of structural micro features, other types of optical micro features may be used, such as scattering, reflective, or refractive particles.

"Optical micro features" thus refer to microscale structures, patterns, particles, or other types of features which are capable of affecting propagation of light, at least for a predetermined design wavelength, so that the light propagating within the light guide plate and being incident on such optical micro feature(s) is at least partially coupled out of the light guide. "Micro" and "microscale" refer to features which have at least some characteristic dimension sized, with regard to a predetermined design wavelength for which the light guide is designed, in the range of sub-wavelength dimensions to some tens of wavelengths.

Said affecting the propagation of light by optical micro features may be based, for example, on refraction, reflection, scattering, or diffraction of the light interacting with the optical micro features. Also more generally, an out-coupling arrangement may comprise any appropriate reflective, refractive, diffractive, and/or scattering optical arrangements configured to couple light propagating in the light channels and interacting with the out-coupling arrangement out of the light guide plate. The optical micro features may comprise, for example, outwards or inwards projecting micro prisms formed on one of the main surfaces of the light guide plate.

In the example of FIG. 1, the line-formed optical micro features are distributed substantially regularly in the area of the first out-coupling stripes. In other embodiments, a plurality of optical micro features may be arranged in an out-coupling arrangement of a light guide plate with a quasi-regular or irregular distribution. To provide non-uniform local out-coupling efficiency, optical micro features may be distributed along the out-coupling stripe with varying population density. Thus, more micro features may be arranged at parts of the out-coupling stripe where higher local out-coupling efficiency is needed. For example, optical micro features may be distributed with a population density which increases when the distance from the end of the light channel from which light is to be received into the light channel increases.

In the case of a regular distribution such as that of the example of FIG. 1, a plurality of micro features may be arranged, for example, in a periodic grid or grating.

The optical micro features or other types of coupling elements may lie substantially on or along one plane. Such plane may be directed parallel to the first and/or the second main surfaces of the light guide, as is the case in the light guide 100 of FIG. 1. In other embodiments, optical micro features or other types of coupling elements may be distributed on or along several different planes which may be directed differently from the first and/or the second main surfaces of the light guide. In yet other embodiments, optical micro features or other types of coupling elements may be distributed within an out-coupling volume.

In the example of FIG. 1, the out-coupling arrangement 120 with the line-formed optical micro features 123 of the first out-coupling stripes 121 lie substantially at or close to the second main surface 113 of the light guide plate 110. Then, the optical micro features may be formed, for example, as surface relief structures. In other embodiments, an out-coupling arrangement in general as well as optical micro features thereof direction may be located, in the vertical or thickness direction, as embedded within a light guide plate or on, or close to, the first main surface of a light guide plate.

In the example of FIG. 1, the out-coupling arrangement is configured to couple light out of the light guide plate through the first main surface 112 thereof. In other embodiments, light may be coupled out through the second main surface of a light guide plate, or through both of the main surfaces.

Figure 5:
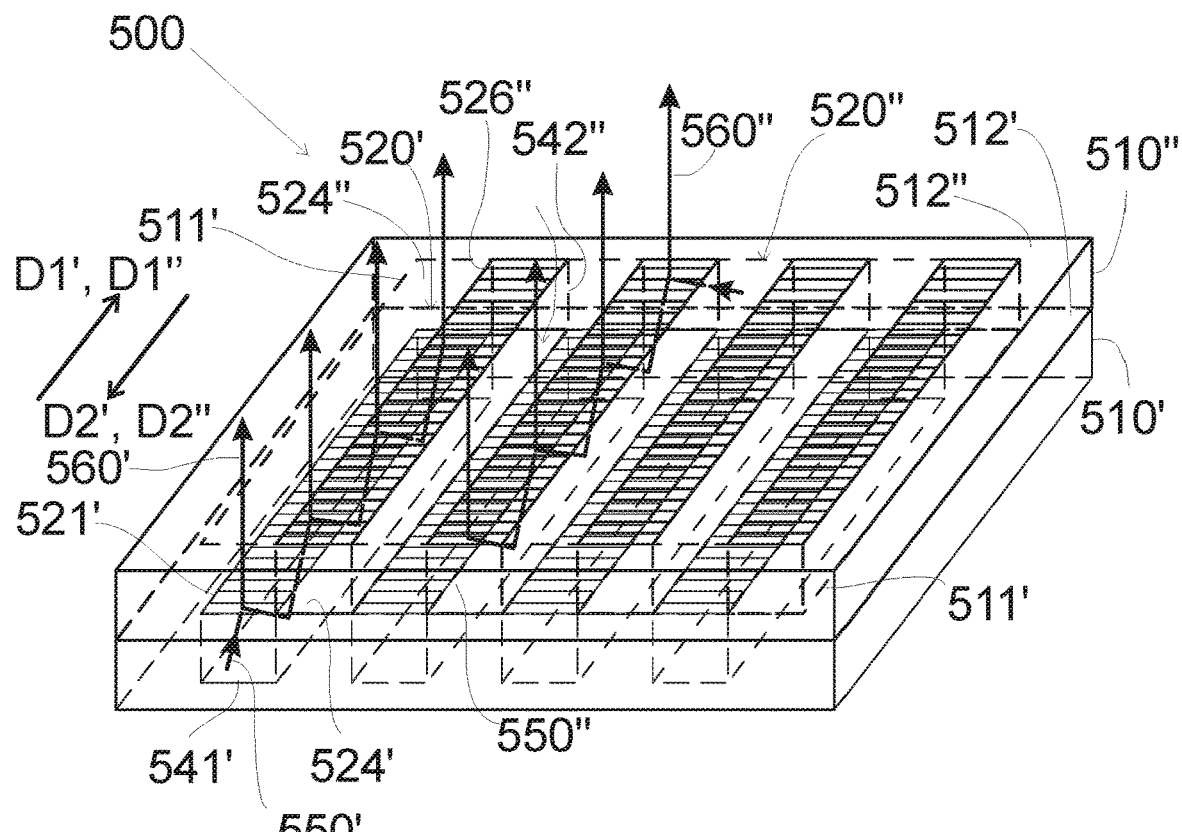

Said configuration of the example light guide plate 110 of FIG. 1 means that the out-coupling arrangement 120 is configured to couple light out of the light guide plate through the different main surface than the main surface at or close to which the out-coupling arrangement lies. In other embodiments, out-coupling arrangements may be configured to couple light out of the light guide plate through the same main surface at or close to which the out-coupling arrangement lies. An example of this is illustrated in FIG. 5.

Each two adjacent first out-coupling stripes 121 are separated from each other by an intermediate region 124 forming a part of the out-coupling arrangement 120. Each intermediate region 124 of the out-coupling arrangement 120 comprises a re-directing arrangement 122. In the example of FIG. 1, the re-directing arrangement covers substantially the entire width of the intermediate region 124 separating the adjacent first out-coupling stripes. The first out-coupling stripes and the re-directing arrangements have substantially identical widths.

The re-directing arrangement 122 is configured to not substantially couple light which propagates in the light guide plate in the first direction and interacts with the re-directing arrangement out of the light guide plate 110. Instead, the re-directing arrangement is configured to couple light 150 originating from one of the neighboring first light channels and interacting with the re-directing arrangement, back towards that light channel. For that purpose, the re-directing arrangements may comprise re-directing features distributed in the area thereof. Examples of this are illustrated in FIG.

2, where re-directing features 225a, 225b of the re-directing arrangement 222a, 222b serve for re-directing light 250a, 250b propagating in the light guide plate 210a, 210b.

Figure 2:
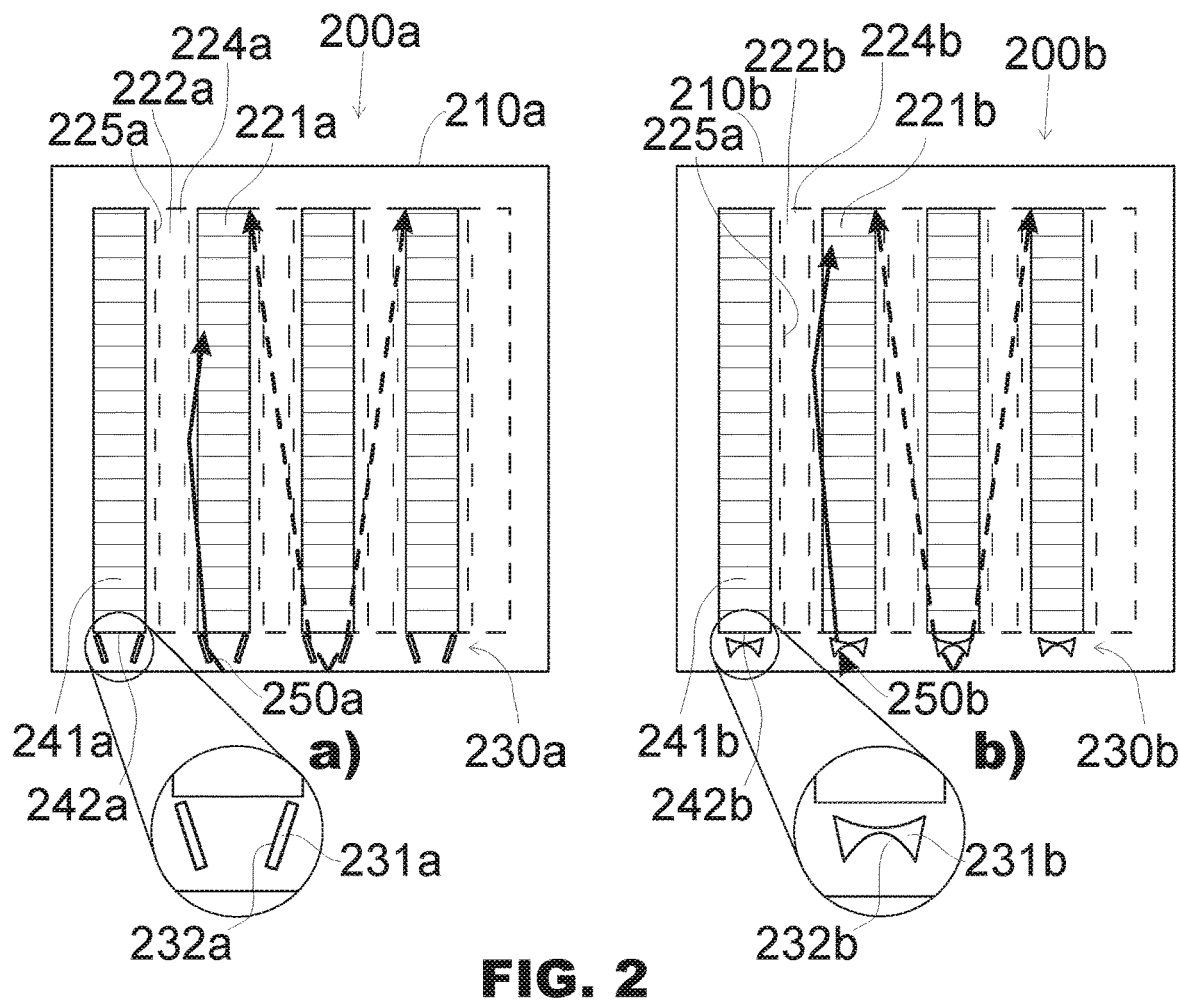
FIGS. 2 and 3 show top views of light guide plates of light guides.

The re-directing arrangements 222a, 222b of the examples of FIG. 2 are configured to re-direct light 250a, 250b originating from one of the neighboring first or second light channels and interacting with the re-directing arrangement, back towards that light channel.

The re-directing features may comprise any appropriate reflective, refractive, or diffractive structures or elements. For example, they may comprise micro-ridges with rectangular, triangle, or wavy cross-section arranged within or on the light guide plate, whereby the interfaces between the micro-ridges and the light guide plate material may form reflective or refractive material interfaces effecting the re-directing function. Also slits or cuts corresponding to those discussed below in the context of the collimating arrangements may be used.

The re-directing arrangement is an example of an intermediate region having light coupling properties which are substantially different from the light coupling properties of the first out-coupling stripes. More specifically, the re-directing arrangement is an example of implementation of an intermediate region having local out-coupling efficiencies which are substantially lower than the local out-coupling efficiencies of the out-coupling stripes. Actually, without any specific out-coupling features present in the intermediate region, the local out-coupling efficiencies may be substantially zero throughout, i.e. at each location of, the intermediate region.

Other embodiments may be implemented without any re-directing arrangements.

Propagation of light in a light channel substantially in the first or in the second direction refers to the average propagation direction, or to the direction of an interpolated propagation line of a possibly back-and-forth bouncing actual propagation path of the light. Thus, although the direction of the actual propagation path may vary, such average direction or direction of interpolated propagation line is then substantially aligned with the first or the second direction.

A light guide plate may have a body formed of any material suitable for light guides for the wavelength range used in the intended application at issue, such as visible wavelengths for the display back light or front light purposes. Possible materials include, for example, acryl and polycarbonate and their different variants, as well as various glass materials suitable for light guide plates.

A light guide as well as the light guide plate thereof may be formed as a rigid element. Alternatively, a light guide and/or a light guide plate may be formed as a flexible and/or bendable element, allowing implementation of a flexible and/or bendable light guide or light guide which may be used, for example, in an illumination arrangement for a bendable display assembly or module.

From manufacturing point of view, flexible or bendable light guide plates may be provided, for example, in a roll-to-roll process. Then, a plurality of light guide plates with coupling arrangements may be initially formed as one single long sheet and cut therefrom afterwards into separate, individual light guide plates.

The out-coupling arrangement may be formed on the surface of a light guide plate, for example, by first printing a curable substance, such as a UV-curable (ultraviolet) resin or lacquer, onto the light guide plate in liquid form, and forming out-coupling structures thereon by printing, simultaneously illuminating the curable agent with UV light. Also substances curable by factors other than UV light, such as heat or a curing agent, may be used.

Light may be received in the first light channels from light-emitting elements, such as light-emitting diodes LEDs, positioned at an edge of the light guide plate. Thereby, the light coupled out of the light guide plate in the area of the first out-coupling stripes, horizontally coincided with the first light channels, may be used for various illumination purposes such as back light or front light illumination of a display. Illumination from different light channels may be controlled by controlling the light emitted into the first light channels via control of the light-emitting elements. Thereby, a light guide with a light guide plate in accordance with the example of FIG. 1 may be used to provide segmented illumination.

A light-emitting element such as a light-emitting diode LED may emit light with relatively high divergence. Thus, significant portion of a light beam emitted by a light-emitting element towards and into a light channel might actually be propagated outside that light channel.

The separation of adjacent first out-coupling stripes by the intermediate region with low or substantially zero local out-coupling efficiencies may advantageously allow some light intended to propagate along a first out-coupling stripe to leak out of it without substantially disturbing the controllability of the segmented illumination provided by the light guide. Namely, as long as the maximum divergence of the light is such that the light leaked out of one first light channel cannot reach the adjacent first light channel, it will not be substantially coupled out of the light guide plate, irrespective of the presence of a re-directing arrangement in the intermediate region. This maximum divergence is marked by dashed arrows in the drawings of FIG. 2 illustrating examples of light guides 200a, 200b with light guide plates 210a, 210b which may be in accordance with any of those discussed above with reference to FIG. 1. With the first out-coupling stripes 221a, 221b and the intermediate regions 224a, 224b having the same width, this maximum divergence may correspond to a width of a light beam emitted to a first light channel which is three times the width of the first out-coupling stripes and the intermediate region.

As illustrated in FIG. 2, the light guide plate 210a of the example a) comprises two opposite slits 231a arranged close to the end 242a of each first light channel 241a. The two slits are directed so as to form a wedge-shaped receiving zone therebetween for receiving light from a light-emitting element and to guide that light, especially the most divergent parts thereof, towards the first light channel 241a.

The slits may be filled, for example, with air or some solid material different from the light guide plate material. With the refractive indices of the light guide plate and the slits selected suitably, light entered into the receiving zone and being incident on the slits may experience total internal reflection and be thereby re-directed towards the first light channel 241a. Thereby, reflective material interfaces are formed by the edges 232a of the slits, i.e. between the slits and the surrounding light guide plate material. Those reflective material interfaces may re-direct the most divergent part of a light beam to the first light channel.

A "slit" basically refers to a volume with a finite thickness, formed within the light guide plate, the volume comprising a material different from the material of the light guide plate. Then, in some embodiments, a "slit" may be formed, for example, by a thin film of a material different from the light guide plate material inserted within the light guide plate. Such material may be, for example, a metal. A metallic "slit" may form a highly reflective surface efficiently re-directing light incident on the interface between the light guide plate material and the metal.

In different configurations of the slits, the slits thus form reflective material interfaces which may re-direct the most divergent parts of a light beam to the associated light channel.

In the example b) of FIG. 2, to improve the alignment of light receive in the light guide plate with the first light channels thereof, the light guide plate comprises a cut-out lens 231b formed in the light guide plate close to the end 242b of each first light channel 241b.

A "cut-out lens" in the light guide plate refers to a lens structure implemented by means of a cavity formed in the light guide plate. Such lens cavity may be filled with air or some solid material different from the light guide plate material. Due to different refractive indices of the light guide plate material and the lens cavity material, light incident on an edge 232b of the lens cavity may be refracted as defined by the refractive index difference and the angle of incidence. Thereby, refractive material interfaces are formed by the edges 232b of the lens cavities, i.e. between the cavities and the surrounding light guide plate material. Those refractive material interfaces may re-direct the most divergent part of a light beam to the first light channel.

A slit or a lens cavity of a cut-out lens may be formed into a light guide plate, for example, by laser cutting. In the case of forming the light guide plate by injection molding, the mold may comprise inserts/shapes resulting in formation of the slits or cavities in the complete light guide plate. So formed slit or cavity may then be filled afterwards with suitable material. It may also be possible to insert pieces of a material different from the light guide plate material within the mold so as to remain in the complete light guide plate and form the slits or cavities therein.

In the examples of FIG. 2, the slits or the cut-out lenses and their reflective and refractive material interfaces, respectively, form collimating arrangements 230a, 230b which may limit the horizontal divergence of, thus "collimate", a light beam emitted to the first light channels. In other embodiments, different collimating arrangements may be used. For example, collimating arrangements may be implemented with both reflective material interfaces and refractive material interfaces. Slits and lenses may be shaped also differently from the examples illustrated in FIG. 2. Further, in the case of a collimating arrangement with lenses forming refractive material interfaces, the lenses may be formed, instead of being formed as cut-out lenses in the light guide plate, as separate lens elements suitably attached to the light guide plate.

The collimating arrangements of the examples of FIG. 2 are formed integrally in the light guide plates 210a, 210b. Then, a light guide plate with the collimating arrangement forms one integral body. In other embodiments, different configurations of collimating arrangements and light guide plates may be implemented.

In yet other embodiments, with light beams emitted to the light channels having sufficiently low divergence, light guides and light guide plates thereof may be implemented without any collimating arrangement.

Although not illustrated in the drawing of FIG. 1, there may also be a collimation arrangement in any of those light guide plates discussed above with reference to FIG. 1 also.

Figure 3:
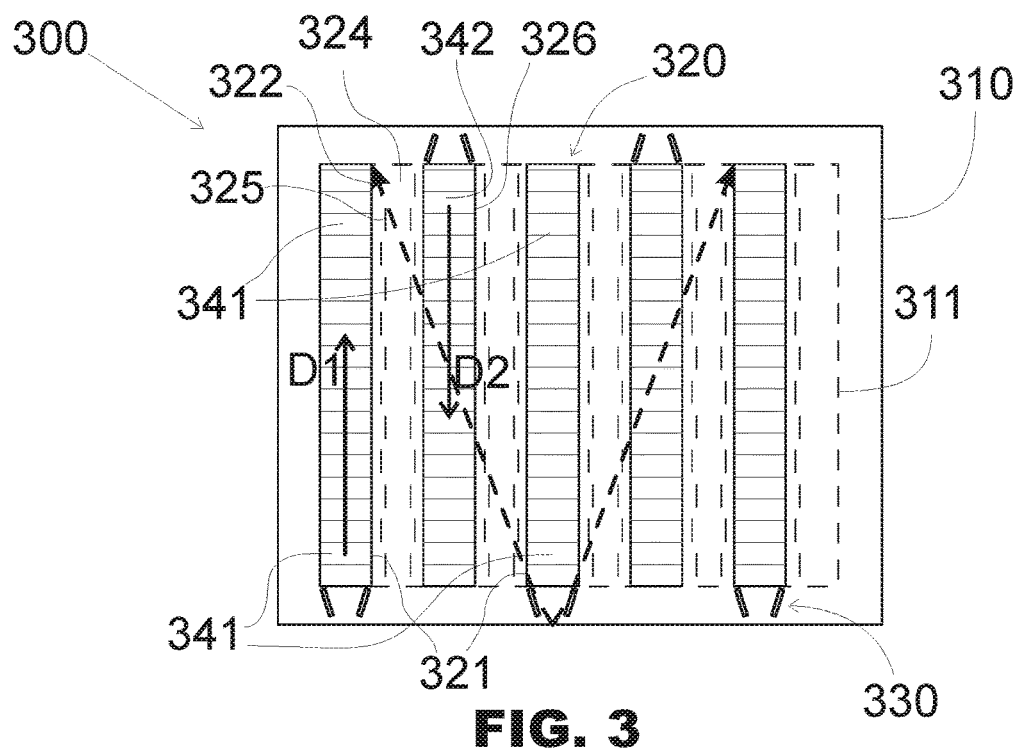

The light guide plate 310 of the light guide 300 illustrated partially in FIG. 3 may be basically in accordance with any of those discussed above with reference to FIGS. 1 and 2. It differs from those in that the out-coupling arrangement 320 comprises, in each intermediate region 324 separating adjacent first coupling stripes 321, a second out-coupling stripe 326. Each second out-coupling stripe defines the horizontal extension of a second light channel 342 in the light guide plate between the first light channels 341 defined by the adjacent first out-coupling stripes 321.

The first and the second out-coupling stripes may be basically similar to each other. Both out-coupling stripes are configured to have an out-coupling performance which is directionally selective in that locally, the out-coupling is efficient for light propagating along the associated light channels substantially in one of its longitudinal directions only. The local out-coupling efficiency to the opposite direction is thus substantially lower. However, for the second out-coupling stripes, that direction is a "second direction" D2 which is opposite to the first direction D1 for which the out-coupling performance of the first coupling stripes is optimized. Thus, the first and the second out-coupling stripes are configured to couple out light propagating in the light guide plate in opposite directions, as indicated by solid arrows in the drawing of FIG. 3. Thereby, the second out-coupling stripes located in the intermediate regions form an example of an intermediate region having light coupling properties which are substantially different from the light coupling properties of the first out-coupling stripes.

In the example of FIG. 3, each intermediate region 324 between two adjacent first out-coupling stripes 321 comprises, in addition to the second out-coupling stripe 326, re-directing arrangements 322 between the first and the second out-intermediate regions. The re-directing arrangements cover substantially the entire width of the parts of the intermediate region 324 remaining outside the second out-coupling stripe. The first and the second out-coupling stripes and the re-directing arrangements have substantially identical widths. Thereby, the intermediate region has a width which is substantially three times the width of the first and the second out-coupling stripes.

The re-directing arrangements 322 are configured to not substantially couple light, which propagates in the light guide plate in the first or in the second direction and interacts with the re-directing arrangement, out of the light guide plate 310. Instead, the re-directing arrangement is configured to re-direct light originating from one of the neighboring first or second light channels and interacting with the re-directing arrangement, back towards that light channel. For that purpose, the re-directing arrangement comprises re-directing features 325, similar to those of FIG. 2, distributed in the area thereof.

Other embodiments with first and second out-coupling stripes may be implemented without re-directing arrangements in the intermediate region. Also then, all the local out-coupling efficiencies of the intermediate region, outside the first and the second out-coupling stripes, may be substantially lower than any of the local out-coupling efficiencies of the first and the second out-coupling stripes may be achieved by any other appropriate means. For example, such substantially lower or substantially zero local out-coupling efficiencies may be provided by just an intermediate region with no additional light coupling or guiding features.

Light may be received in the first and the second light channels from light-emitting elements, such as light-emitting diodes LEDs, positioned at the opposite edges of the light guide plate. Thereby, the light coupled out of the light guide plate in the area of the first and the second out-coupling stripes may be used for various illumination purposes such as back light or front light illumination of a display. Illumination from different light channels may be controlled by controlling the light emitted into the first and the second light channels via control of the light-emitting elements. Thereby, a light guide plate in accordance with the example of FIG. 3 may be used to provide segmented illumination.

The light guide plate 310 of FIG. 3 comprises collimating arrangements 330 at the opposite edges of the light guide plate 310 to concentrate the light energy received into the light guide plate to the first and the second light channels 341, 342 extending over the illuminating region 311. In the example of FIG. 3, the collimating arrangements are in accordance with the example a) of FIG. 2. Other embodiments may be implemented with different kinds of collimating arrangements, such as any other of those discussed above with FIG. 2, or without any collimating arrangement.

The separation of two adjacent first out-coupling stripes, and then also two adjacent second out-coupling stripes, by the intermediate region with a width which is three times the width of the out-coupling stripes may advantageously allow higher divergence of input light than the light guide plates of FIGS. 1 and 2. Namely, as long as the maximum divergence of the light is such that the light leaked out of one first or second light channel cannot reach the next adjacent first or second light channel, respectively, it will not be coupled out of the light guide plate, irrespective of the presence of re-directing arrangements in the intermediate region. This maximum divergence is marked by dashed arrows in the drawing of FIG. 3. With the first out-coupling stripes and the portions of the intermediate regions outside the out-coupling stripes having the same width, this maximum divergence may correspond to a width of a light beam emitted to a first light channel which is seven times the width of the out-coupling stripes.

Any of the light guide plates discussed above with reference to FIGS. 1 to 3 may be utilized to implement a light guide with two or more light guide plates superposed on top of each other. Examples of light guides with light guide plates superposed on top of each other are illustrated in FIGS. 4 and 5.

Figure 4:
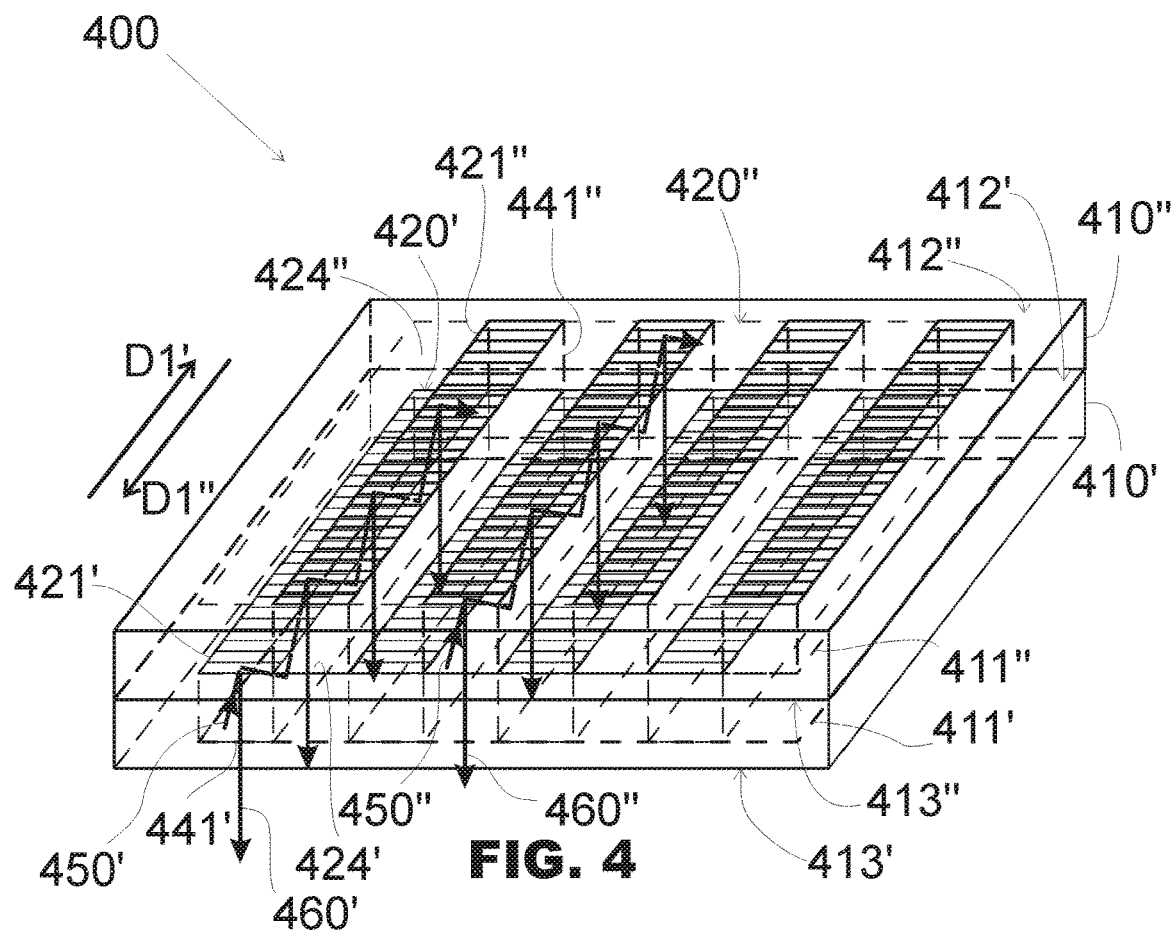
FIGS. 4 and 5 illustrate light guides with two light guide plates as partially transparent perspective views.

The light guide plates 410', 410" of the light guide 400 of FIG. 4 may be basically in accordance with any of those light guide plates discussed above with reference to FIGS. 1 and 2. The two light guide plates may be basically mutually similar. They are however rotated horizontally 180 degrees relative to each other so that the "first" directions D1', D1" thereof are opposite to each other. Other embodiments may be implemented without such rotation. Further, the two light guide plates are transferred horizontally, in the lateral direction of the first light channels thereof, so that the first out-coupling stripes 421" and the first light channels 441' of the lower light guide plate 410' are horizontally aligned with the intermediate regions 424" of the out-coupling arrangement of the upper light guide plate 410". The same applies vice versa, i.e. the first out-coupling stripes 421" and the first light channels 441" of the upper light guide plate 410" are horizontally aligned with the intermediate regions 424' of the out-coupling arrangement of the lower light guide plate 410'. In other words, the first light channels 441' of the lower light guide plate 410' are horizontally aligned between the first light channels 441" of the upper light guide plate 410". Thereby, a light channel of one light guide plate is horizontally aligned between two adjacent light channels of the other light guide plate.

The two light guide plates lie with their first main surfaces 412', 412" facing to the same direction. Then, the out-coupling arrangements 420', 420" thereof are arranged to couple light out of the light guide plates to the same side of the light guide.

With light 450', 450" transmitted to the first light channels 441', 441" of the two light guide plates, the first out-coupling stripes 421', 421" of the two light guide plates couple light 460', 460" out of the light guide 400 in the illumination regions 411', 411" of the light guide plates, as illustrated by arrows in the drawing of FIG. 4. Differently from the example of FIG. 1, the out-coupling arrangements lie at or close to the first main surfaces 412', 412" of the light guide plates and are configured to couple light out of the light guide plate through the second main surfaces 413', 413" of the light guide plates.

The light guide plates 510', 510" of the light guide 500 of FIG. 5 may be in basically accordance with any of those light guide plates discussed above with reference to FIG. 3. The two light guide plates may be basically mutually similar. They are transferred horizontally, in the lateral direction of the first and the second light channels thereof, so that the first and the second light channels 541', 542' of the lower light guide plate 510' are horizontally aligned with the parts of the intermediate regions 524" of the upper light guide plate 510" remaining outside the second out-coupling stripes 526" thereof. The other way round, the first and the second light channels 541", 542" of the upper light guide plate 510" are horizontally aligned with the parts of the intermediate regions 524' of the lower light guide plate 510' remaining outside the second out-coupling stripes 526' thereof. In other words, the first light channels 441' of the lower light guide plate 410' are horizontally aligned between the first light channels 441" of the upper light guide plate 410", and vice versa. The "first" directions D1', D1" and the opposite "second" directions D2', D2" of the two light guide plates are mutually substantially parallel.

The two light guide plates lie with their first main surfaces 512', 512" facing to the same side of the light guide. Then, the out-coupling arrangements 520', 520" thereof are arranged to couple light out of the light guide plates to the same side of the light guide.

With light 550', 550" transmitted to the first and the second light channels 541', 542', 541", 542" of the two light guide plates, the first and the second out-coupling stripes 521', 526', 521", 526" of the two light guide plates couple light 560', 560" out of the light guide 500 in the illumination regions 511', 511" of the light guide plates, as illustrated by arrows in the drawing of FIG. 5.

In the example of FIG. 5, the out-coupling arrangements 520', 520" lie at or close to the first main surfaces 512', 512" of the light guide plates, and are configured to couple light out of the light guide plates through the same first main surfaces. Thus, differently from the examples of FIGS. 1 and 4, the out-coupling arrangements are configured to couple light out of the light guide plates through the same main surfaces at or close to which the out-coupling arrangement lies.

In the examples of FIGS. 4 and 5, the upper light guide plate 410", 510" may lie on the lower light guide plate 410', 410" without being specifically attached to each other. There may then be a microscopic air gap between the superposed light guide plates. It may also be possible to have the two superposed light guide plates 410', 410", 510', 510" attached to each other by any appropriate means to provide a stable assembly with appropriate optical properties. For example, the two light guide plates may be attached by a layer of an optically clear adhesive (OCA), such as liquid optically clear adhesive (LOCA), arranged therebetween. There are available optically clear adhesive materials, i.e. ones capable of forming optically clear adhesive layers and structures, based on, for example, acryl and silicone. Optical clarity may be important in order to not disturb propagation of light coupled out of one of the light guide plates towards the other one.

In the light guides 400, 500 of FIGS. 4 and 5, each light channel and the associated out-coupling stripe may produce an illumination stripe out of the light guide. Each illumination stripe may be controlled by controlling the light input into the corresponding light channel. Thereby, the light guide may be used to provide segmented illumination, for example, for back light of front light illumination of a display. Such segmented illumination of a display may enable, for example, implementing a display with high dynamic range HDR contrast performance.

In superposed light guide configurations such as those of FIGS. 4 and 5, the local out-coupling efficiencies of the first and/or the second out-coupling stripes may be configured so as to be lower at and close to the lateral edges of the out-coupling stripes than in the middle region thereof. This may advantageously prevent or alleviate formation of bright lines in the output illumination around the interface of two adjacent illumination segments.

The principle of superposed light guide plates discussed above with reference to FIGS. 4 and 5 may also be implemented in embodiments with more than two light guide plates superposed on top of each other. In such multi-layer light guides, the light channels of each layer may be horizontally aligned similarly to the examples of FIGS. 4 and 5 so that there are no overlapping light channels in different light guide plates. In some embodiments, it may also be possible to have two or more light channels of different light guide plates partially or completely overlapping each other.

Figure 6:
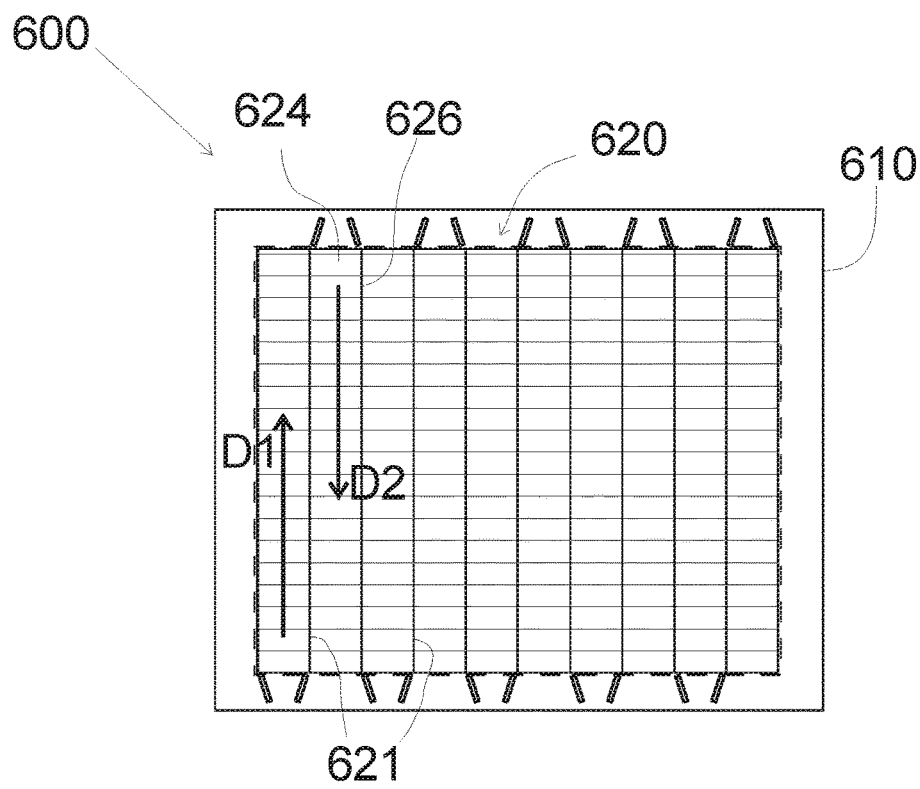
FIG. 6 show a top view of a light guide with single light guide plate.

The light guide 600 illustrated partially in FIG. 6 differs from those discussed above with reference to FIG. 3 in that the out-coupling arrangement 620 of the light guide plate 610 does not comprise any re-directing arrangement. Instead, in the example of FIG. 6, the second out-coupling stripes 626 cover substantially entirely the intermediate regions 624 lying between and separating two adjacent first out-coupling stripes 621. The first and the second out-coupling stripes 621, 626 have substantially identical widths.

Similarly to the light guide plates discussed above with reference to FIGS. 1 and 3, the first and the second out-coupling stripes 621, 626 have directionally selective out-coupling performance. Thus, the first out-coupling stripes 621 are configured to couple out light which propagates in the first light channels mainly into the first direction D1. Respectively, the second out-coupling stripes are configured to couple out light which propagates in the second light channels mainly into the second direction D2 which is opposite to the first direction.

The second out-coupling stripes covering substantially entirely the intermediate region is an example of an intermediate region with light coupling properties substantially different from those of the first out-coupling stripes.

With regard to the maximum divergence of light input into a light channel, the situation is similar to the light guide plates discussed above with reference to FIGS. 1 and 2. Thus, in order to not substantially disturb the controllability of segmented illumination produced by the light guide plate 610, the maximum divergence may correspond to a width of a light beam emitted to a light channel which is three times the width of the out-coupling stripes.

Light guide plates in accordance with that of FIG. 6 may be used to implement one-layer light guides, i.e. light guides with one light guide plate only, capable of providing segmented illumination.

The light guide plates illustrated in FIGS. 1 to 6 comprise, for the sake of clarity of the illustration, coupling arrangements with a few out-coupling stripes only, and thus with a few light channels only. It is to be noted that embodiments in accordance with any of the examples and embodiments discussed above may be implemented with any appropriate number of out-coupling stripes and light channels.

Figure 7:
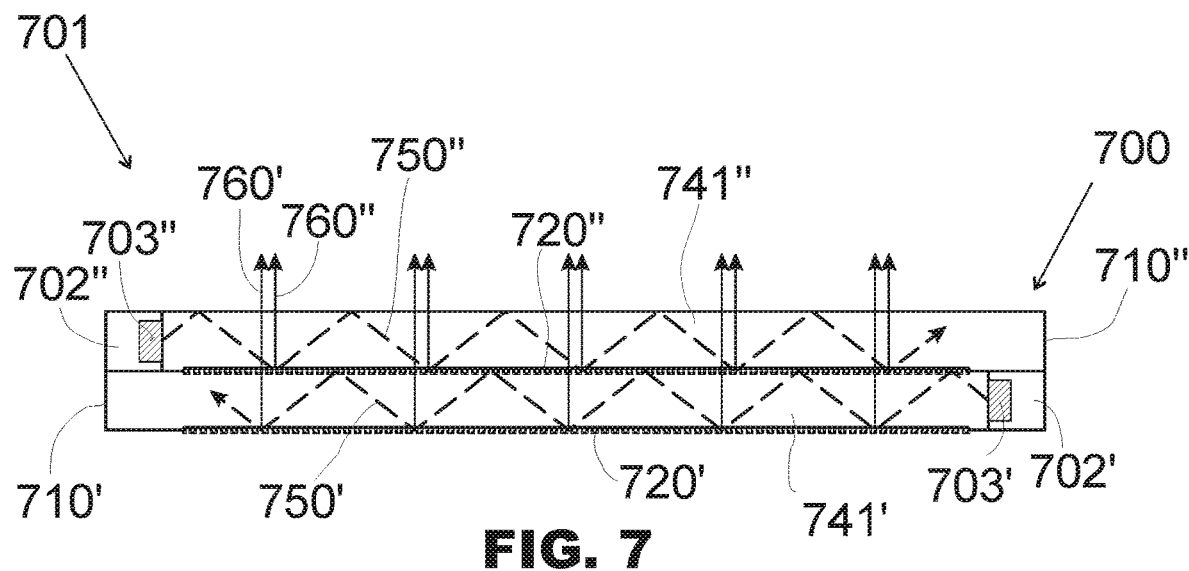
FIG. 7 illustrate a side sectional view of an illumination module.

The illumination module 701 comprises a light guide 700 with two light guide plates 710', 710" superposed on top of each other. The light guide 700 may be in accordance with any of the two-layer light guides discussed above with reference to FIGS. 4 and 5. In the drawing of FIG. 7, the light channels 741', 741" are illustrated as if lying on top of each other. However, this is an illustrative issue only; as discussed above with reference to FIGS. 4 and 5, the light channels of the superposed light guide plates area horizontally aligned between each other.

In other embodiments, display illumination modules may be implemented with one-layer light guide configurations, such as that of FIG. 6.

A light-emitting unit 702', 702" with a plurality of LEDs 703', 703" as light-emitting elements, one for each light channel 741', 741" of the light guide plates, is attached at an edge of each light guide plate 710', 710". In other embodiments, light-emitting elements other than LEDs may be used.

The LEDs are arranged for emitting light 750', 750" into the light channels, in the "first" and/or "second" directions thereof. When in use, the out-coupling arrangements 720', 720" of the light guide plates couple the light 750', 750" propagating in the light channels out of the light guide plates so as to produce segmentally controllable illumination 760', 760" to one side of the light guide 700, as marked by arrows in the drawing of FIG. 7.

An illumination module in accordance with those discussed above with reference to FIG. 7 may be used, for example, to provide segmented back light or front light illumination for a display.

Figure 8:
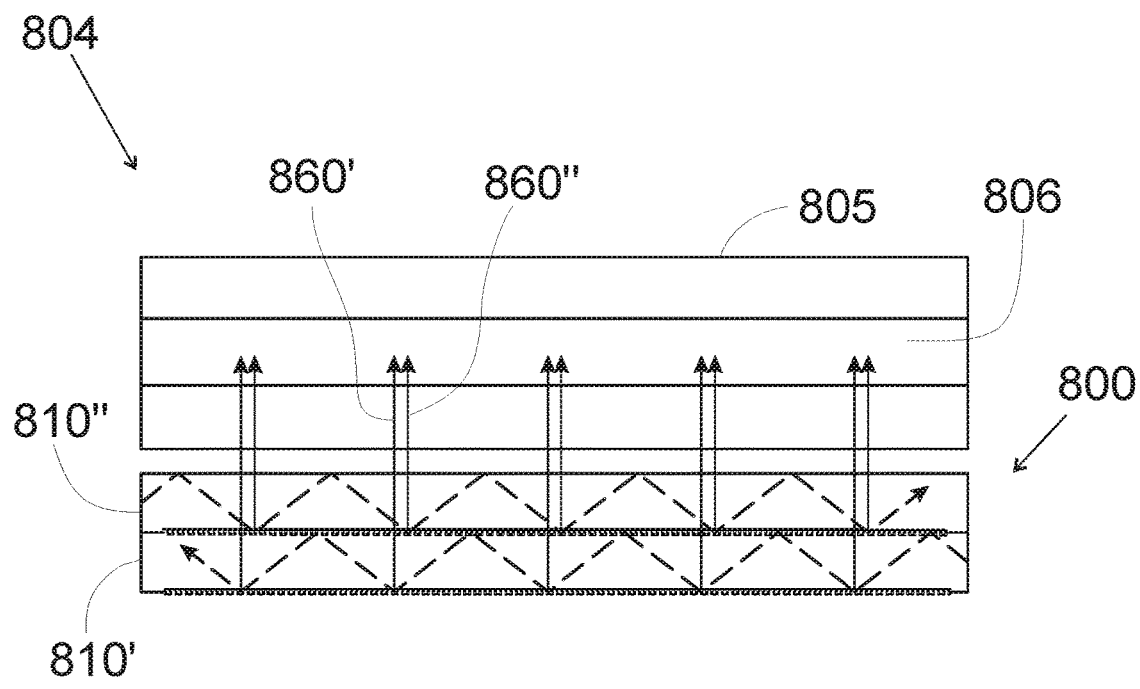
FIG. 8 illustrates a side sectional view of a display module.

The display assembly 804 of FIG. 8 comprises a light guide 800 with two light guide plates 810', 810" superposed on top of each other. The light guide 800 may be in accordance with any of the two-layer light guides discussed above with reference to FIGS. 4 and 5. In other embodiments, display illumination modules may be implemented with one-layer light guide configurations, such as that of FIG. 6.

Further, the display assembly comprises an LCD display panel 805 with a liquid crystal layer 806 as the actual display element. In other embodiments, other display panel types and other display element types, respectively, may be used.

In the display assembly 804, with the display element in use, the light guide 800 serves for illuminating the LCD display panel. It provides segmented light 860', 860" for back light illumination of the liquid crystal layer 806, as illustrated by arrows in the drawing of FIG. 8. In other embodiments, back light or front light illumination for different display types may be provided. Although not illustrated in FIG. 8, there may be one or more light-emitting units, such as those discussed above with reference to FIG. 7. A display element may be however manufactured and supplied without any light-emitting unit. Then, appropriate light-emitting means may be added at any later stage or there may be light-emitting means included in a device into which the display element is to be incorporated.

In addition to the layers ad elements illustrated in FIGS. 7 and 8, complete illumination modules and display assemblies may comprise any appropriate further layers, elements, or structures. For example, there may be a diffuser, a brightness enhancement film (BEF), and/or a reflector arranged to co-operate with the light guide plate(s) of an illumination module or a display assembly.

In the examples a) and b) of FIG. 9, optical micro features in the form of micro prisms 923a, 923b are formed on the second main surfaces 913a, 913b of the light guide plates. The micro prisms are asymmetrical in the longitudinal direction of the light channels. Both prisms have one face directed at relatively large angle relative to the second main surface so that light 950a', 950b' propagating in a first direction is reflected at that facet and directed out of the light guide plate as out-coupled light 960a', 960b'.

The other facets of the micro prisms are directed differently. In the example a), that other facet lies perpendicularly relative to the second main surface 913a of the light guide plate. Then, light 950a" propagating in the light guide plate substantially in a second direction opposite to the first direction experiences merely slight refractions at the surfaces of the micro prism 923a, and continues propagation further in the light guide plate without being coupled out of it. In the example b), the other facet is directed only slightly differing from the direction of the second main surface 913b. Then, light 950b" propagating in the light guide plate in the second direction reflects at this facet and continues propagation further in the light guide plate without being coupled out of it.

In other embodiments, directionally selective local out-coupling efficiencies may be achieved by means of any other appropriate arrangements.

Some embodiments are further discussed shortly in the following.

A light guide for segmented illumination may be implemented, comprising a light guide plate with an illumination region, the light guide plate having a first main surface and a second main surface opposite to the first main surface and separated therefrom by a thickness of the light guide plate, and comprising an out-coupling arrangement for coupling light propagating in the light guide plate and interacting with the out-coupling arrangement out of the light guide plate through the first and/or the second main surface in the illumination region; wherein the out-coupling arrangement comprises a plurality of first out-coupling stripes extending over the illumination region, each first out-coupling stripe defining a horizontal extension of a first light channel in the light guide plate and being configured to couple light propagating, with the light guide in use, substantially in a first direction along the first light channel, out of the light guide plate; adjacent first out-coupling stripes being separated by an intermediate region with light coupling properties substantially different from those of the first out-coupling stripes.

In an embodiment, the intermediate region comprises a second out-coupling stripe extending over the illumination region and defining a horizontal extension of a second light channel in the light guide plate, the second out-coupling stripe being configured to couple light propagating, with the light guide in use, substantially in a second direction along the second light channel, out of the light guide plate, the second direction being substantially opposite to the first direction.

In an embodiment, the first and the second out-coupling stripes have local out-coupling efficiencies for light propagating in the light guide plate substantially in the first and in the second direction, respectively, substantially higher than the local out-coupling efficiencies at the same locations for light propagating in the light guide plate substantially in the opposite directions.

In an embodiment, the intermediate region has, outside the out-coupling stripes, substantially zero local out-coupling efficiencies.

In an embodiment, the intermediate region comprises, outside the out-coupling stripes, a re-directing arrangement configured to direct light, originating from one of the light channels and a propagating in the light guide plate outside the light channels, back towards the light channel from where it originates.

In an embodiment, an out-coupling stripe comprises optical micro features. The optical micro features may comprises lines lying substantially perpendicular to the longitudinal direction of the out-coupling stripe.

In an embodiment, the light guide further comprises a collimating arrangement configured to limit horizontal divergence of a light beam emitted, with the light guide in use, to a light channel of the light guide plate. The collimating arrangement may be formed integrally in the light guide plate. The collimating arrangement may comprise a reflecting material interface configured to re-direct a divergent part of the light beam. The collimating arrangement may comprise a refracting material interface configured to at least partially collimate the light beam.

In an embodiment with a second out-coupling stripe in the intermediate region, the second out-coupling stripe covers substantially entirely the width of the intermediate region.

In an embodiment, two light guide plates are superposed on top of each other with a light channel of one of the light guide plates horizontally aligned between two adjacent light channels of the other light guide plate.

An illumination module may be implemented comprising a light guide as defined above, and a plurality of light-emitting elements such as LEDs arranged for emitting light to the light channels.

A display assembly such as a liquid crystal display assembly may be implemented comprising a display element such as a liquid crystal layer and a light guide as defined above arranged for illuminating the display element.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

The invention claimed is:

1. A light guide for segmented illumination, comprising a light guide plate with an illumination region, the light guide plate having a first main surface and a second main surface opposite to the first main surface and separated therefrom by a thickness of the light guide plate, and comprising an out-coupling arrangement for coupling light propagating in the light guide plate and interacting with the out-coupling arrangement out of the light guide plate through at least one of the first main surface or the second main surface in the illumination region;

wherein the out-coupling arrangement comprises a plurality of first out-coupling stripes extending over the illumination region, each first out-coupling stripe defining a horizontal extension of a first light channel in the light guide plate and being configured to couple light propagating, with the light guide in use, substantially in a first direction along the first light channel, out of the light guide plate; adjacent first out-coupling stripes being separated by an intermediate region with light coupling properties substantially different from those of the first out-coupling stripes, wherein the intermediate region comprises a second out-coupling stripe extending over the illumination region and defining a horizontal extension of a second light channel in the light guide plate, the second out-coupling stripe being configured to couple light propagating, with the light guide in use, substantially in a second direction along the second light channel, out of the light guide plate, the second direction being substantially opposite to the first direction, wherein the first and the second out-coupling stripes have local out-coupling efficiencies for light propagating in the light guide plate substantially in the first direction and in the second direction, respectively, substantially higher than the local out-coupling efficiencies at the same locations for light propagating in the light guide plate substantially in the opposite directions.

2. A light guide as defined in claim 1, wherein the intermediate region has, outside the out-coupling stripes, substantially zero local out-coupling efficiencies.

3. A light guide as defined in claim 1, wherein the intermediate region comprises, outside the out-coupling stripes, a re-directing arrangement configured to direct light, originating from one of the light channels and a propagating in the light guide plate outside the light channels, back towards the light channel from where it originates.

4. A light guide as defined in claim 1, wherein an out-coupling stripe comprises optical micro features.

5. A light guide as defined in claim 4, wherein the optical micro features comprises lines lying substantially perpendicular to a longitudinal direction of the out-coupling stripe.

6. A light guide as defined in claim 1, further comprising a collimating arrangement configured to limit horizontal divergence of a light beam emitted, with the light guide in use, to a light channel of the light guide plate.

7. A light guide as defined in claim 6, wherein the collimating arrangement is formed integrally in the light guide plate.

8. A light guide as defined in claim 6, wherein the collimating arrangement comprises a reflecting material interface configured to re-direct a divergent part of the light beam.

9. A light guide as defined in claim 6, wherein the collimating arrangement comprises a refracting material interface configured to at least partially collimate the light beam.

10. A light guide as defined in claim 1, wherein the second out-coupling stripe covers substantially entirely a width of the intermediate region.

11. A light guide as defined in claim 1, wherein two light guide plates are superposed on top of each other with a light channel of one of the light guide plates horizontally aligned between two adjacent light channels of the other light guide plate.

12. An illumination module comprising a light guide as defined in claim 1, and a plurality of light-emitting elements such as LEDs arranged for emitting light to the light channels.

13. A display assembly such as a liquid crystal display assembly comprising a display element such as a liquid crystal layer and a light guide as defined in claim 1 arranged for illuminating the display element.

\* \* \* \* \*